United States Patent
Ganapathy et al.

(10) Patent No.: US 8,088,525 B2
(45) Date of Patent: Jan. 3, 2012

(54) ONLINE LOW PERFORMING CELL (LPC) PREDICTION AND DETECTION OF FUEL CELL SYSTEM

(75) Inventors: Sriram Ganapathy, Rochester, NY (US); John P. Salvador, Penfield, NY (US); Frank X. Leo, Honeoye Falls, NY (US); Balasubramanian Lakshmanan, Pittsford, NY (US); Brian McMurrough, Honeoye Falls, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 945 days.

(21) Appl. No.: 12/027,070

(22) Filed: Feb. 6, 2008

(65) Prior Publication Data

US 2009/0197155 A1 Aug. 6, 2009

(51) Int. Cl.
  *H01M 8/04* (2006.01)
(52) U.S. Cl. ......... 429/430; 429/431; 429/432; 429/427
(58) Field of Classification Search ........... 429/428–432
  See application file for complete search history.

(56) References Cited

U.S. PATENT DOCUMENTS

| | | | |
|---|---|---|---|
| 6,794,844 B2 * | 9/2004 | Hochgraf et al. | 320/101 |
| 6,847,188 B2 * | 1/2005 | Keskula et al. | 320/101 |
| 7,124,040 B2 * | 10/2006 | Engelhardt et al. | 702/58 |
| 7,569,293 B1 * | 8/2009 | Cross, III | 429/412 |
| 2006/0166051 A1 * | 7/2006 | Murthy et al. | 429/13 |
| 2008/0182139 A1 * | 7/2008 | Ganapathy et al. | 429/13 |
| 2008/0241608 A1 * | 10/2008 | Zhang et al. | 429/13 |

* cited by examiner

*Primary Examiner* — Raymond Alejandro
(74) *Attorney, Agent, or Firm* — John A. Miller; Miller IP Group, PLC

(57) ABSTRACT

A system and method for detecting and predicting low performing cells in a fuel cell stack. When the fuel cell stack is running and certain data validity criteria have been met, an algorithm collects the data, such as stack current density, average cell voltage and minimum cell voltage. This information is used to estimate predetermined parameters that define the stack polarization curve. The system defines a predetermined minimum current density that is used to identify a low performing cell. The system then calculates an average cell voltage and a minimum cell voltage at the minimum current density set-point, and calculates a cell voltage difference between the two. If the cell voltage difference is greater than a predetermined low voltage threshold and the minimum cell voltage is less than a predetermined high voltage threshold, the algorithm sets a flag identifying a potential for a low performing cell.

20 Claims, 2 Drawing Sheets

ONLINE LOW PERFORMING CELL (LPC) PREDICTION AND DETECTION OF FUEL CELL SYSTEM

BACKGROUND OF THE INVENTION

1. Field of the Invention

This invention relates generally to a system and method for detecting a low performing cell in a fuel cell stack and, more particularly, to a system and method for detecting a low performing cell in a fuel cell stack before the low performing cell becomes a stack performance problem for preventative maintenance purposes.

2. Discussion of the Related Art

Hydrogen is a very attractive fuel because it is clean and can be used to efficiently produce electricity in a fuel cell. A hydrogen fuel cell is an electrochemical device that includes an anode and a cathode with an electrolyte therebetween. The anode receives hydrogen gas and the cathode receives oxygen or air. The hydrogen gas is dissociated in the anode to generate free hydrogen protons and electrons. The hydrogen protons pass through the electrolyte to the cathode. The hydrogen protons react with the oxygen and the electrons in the cathode to generate water. The electrons from the anode cannot pass through the electrolyte, and thus are directed through a load to perform work before being sent to the cathode.

Proton exchange membrane fuel cells (PEMFC) are a popular fuel cell for vehicles. The PEMFC generally includes a solid polymer electrolyte proton conducting membrane, such as a perfluorosulfonic acid membrane. The anode and cathode typically include finely divided catalytic particles, usually platinum (Pt), supported on carbon particles and mixed with an ionomer. The catalytic mixture is deposited on opposing sides of the membrane. The combination of the anode catalytic mixture, the cathode catalytic mixture and the membrane define a membrane electrode assembly (MEA). MEAs are relatively expensive to manufacture and require certain conditions for effective operation.

Several fuel cells are typically combined in a fuel cell stack to generate the desired power. The fuel cell stack receives a cathode input gas, typically a flow of air forced through the stack by a compressor. Not all of the oxygen is consumed by the stack and some of the air is output as a cathode exhaust gas that may include water as a stack by-product. The fuel cell stack also receives an anode hydrogen input gas that flows into the anode side of the stack.

The stack controller needs to know the current/voltage relationship, referred to as a polarization curve, of the fuel cell stack to provide a proper distribution of power from the stack and to provide reactants to the stack. The relationship between the voltage and the current of the stack is typically difficult to define because it is non-linear, and changes depending on many variables, including stack temperature, stack partial pressures and cathode and anode stoichiometries. Additionally the relationship between the stack current and voltage changes as the stack degrades over time. Particularly, an older stack will have lower cell voltages, and will need to provide more current to meet the power demands than a new, non-degraded stack.

Fortunately, many fuel cell systems, once they are above a certain temperature, tend to have repeatable operating conditions at a given current density. In those instances, the voltage can be approximately described as a function of stack current density and age.

SUMMARY OF THE INVENTION

In accordance with the teachings of the present invention, a system and method are disclosed for detecting and predicting low performing cells in a fuel cell stack. When the fuel cell stack is running and certain data validity criteria have been met, an algorithm collects the data, such as stack current density, average cell voltage and minimum cell voltage. This information is used to estimate predetermined parameters that define the stack polarization curve. The system defines a predetermined minimum current density that is used to identify a low performing cell. The system then calculates an average cell voltage and a minimum cell voltage at the minimum current density set-point, and calculates a cell voltage difference between the two. If the cell voltage difference is greater than a predetermined low voltage threshold and the minimum cell voltage is less than a predetermined high voltage threshold, the algorithm sets a flag identifying a potential for a low performing cell.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a system and method for detecting a potentially low performing cell in a fuel cell stack is merely exemplary in nature, and is in no way intended to limit the invention or it's applications or uses.

Many control parameters of a fuel cell system require knowledge of the polarization curve of the fuel cell stack, such as knowing the maximum voltage potential and current draw available from the fuel cell stack. As mentioned above, as the stack ages, the stack polarization curve also changes as a result of stack degradation. U.S. patent application Ser. No. 11/669,898, filed Jan. 31, 2007, titled Algorithm for Online Adaptive Polarization Curve Estimation of a Fuel Cell Stack, assigned to the Assignee of this application and herein incorporated by reference, discloses an algorithm for calculating the polarization curve of a fuel cell stack online as the fuel cell system is being operated. The algorithm of the '898 application estimates two or more stack parameters from collected data as the stack is being operated, and uses the parameters to calculate the polarization curve. When the fuel cell stack is running and certain data validity criteria have been met, the algorithm goes into a good collection mode where it collects stack data, such as stack current density, average cell voltage and minimum cell voltage. When the stack is shut down, the algorithm uses a cell voltage model to solve a non-linear least squares problem to estimate predetermined parameters that define the polarization curve. If the estimated parameters satisfy certain termination criteria, then the estimated parameters are stored to be used by a system controller to calculate the polarization curve of the stack for future stack runs.

Figure 1:
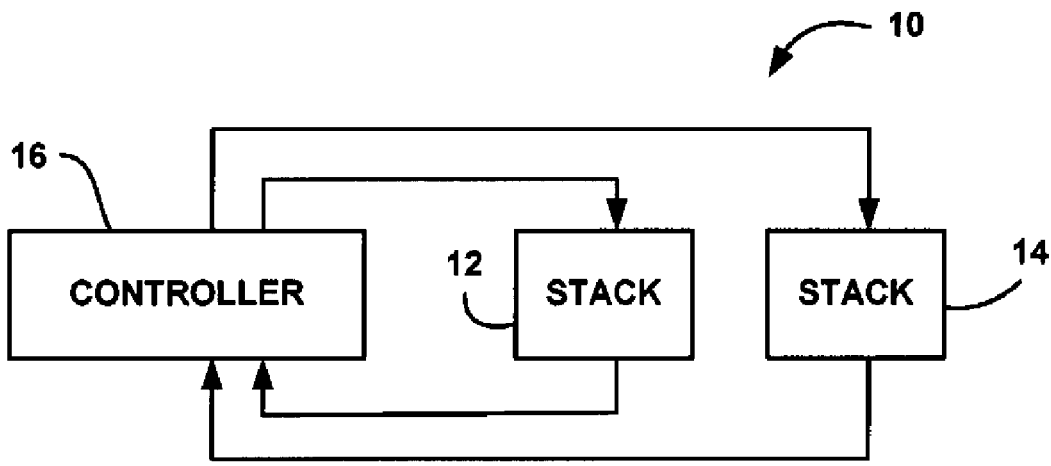
FIG. 1 is a block diagram of a fuel cell system including split stacks and a controller.

FIG. 1 is a block diagram of a fuel cell system 10 including a first split stack 12, a second split stack 14 and a controller 16. The controller 16 receives information from the split stacks 12 and 14, and the controller 16 controls the split stacks 12 and 14. The controller 16 uses the information to calculate the polarization curve of the stacks 12 and 14 in real time, and identify a potentially low performing cell.

Figure 2:
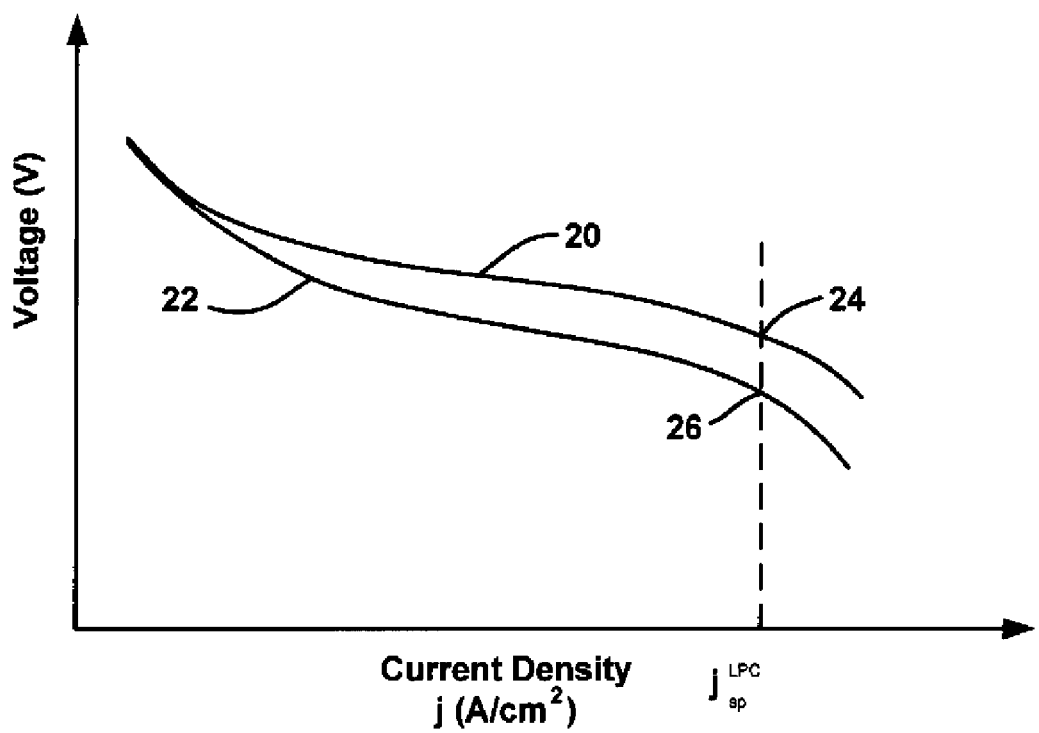
FIG. 2 is a graph with stack current density on the horizontal axis and stack voltage on the vertical axis showing fuel cell stack polarization curves for an average cell and a minimum cell in the stack.

FIG. 2 is a graph with current density on the horizontal axis and voltage on the vertical axis showing a polarization curve 20 for an average cell in the fuel cell stack 12 or 14 and a polarization curve 22 for a minimum cell in the stack 12 or 14. A low performing cell current density set-point $j_{sp}^{LPC}$ is defined based on stack testing, analysis and evaluation that can be used to identify the potential for a low performing cell in the stack 12 or 14. The location where the current density set-point $j_{sp}^{LPC}$ intersects the polarization curve 20 at point 24 identifies the average cell voltage $CV^{Avg}$ and intersects the polarization curve 22 at point 26 identifies the minimum cell voltage $CV^{min}$ for the current density set-point $j_{sp}^{LPC}$.

As will be discussed in detail below, the present invention proposes a process and related algorithm for identifying or detecting the potential for a low performing cell in either of the fuel cell stacks 12 or 14 so as to predict when a low performing cell may present a significant performance problem where service of the fuel cell system 10 is necessary. Particularly, the algorithm identifies a potentially low performing cell in the fuel cell stack 12 or 14 that is getting worse over time.

Figure 3:
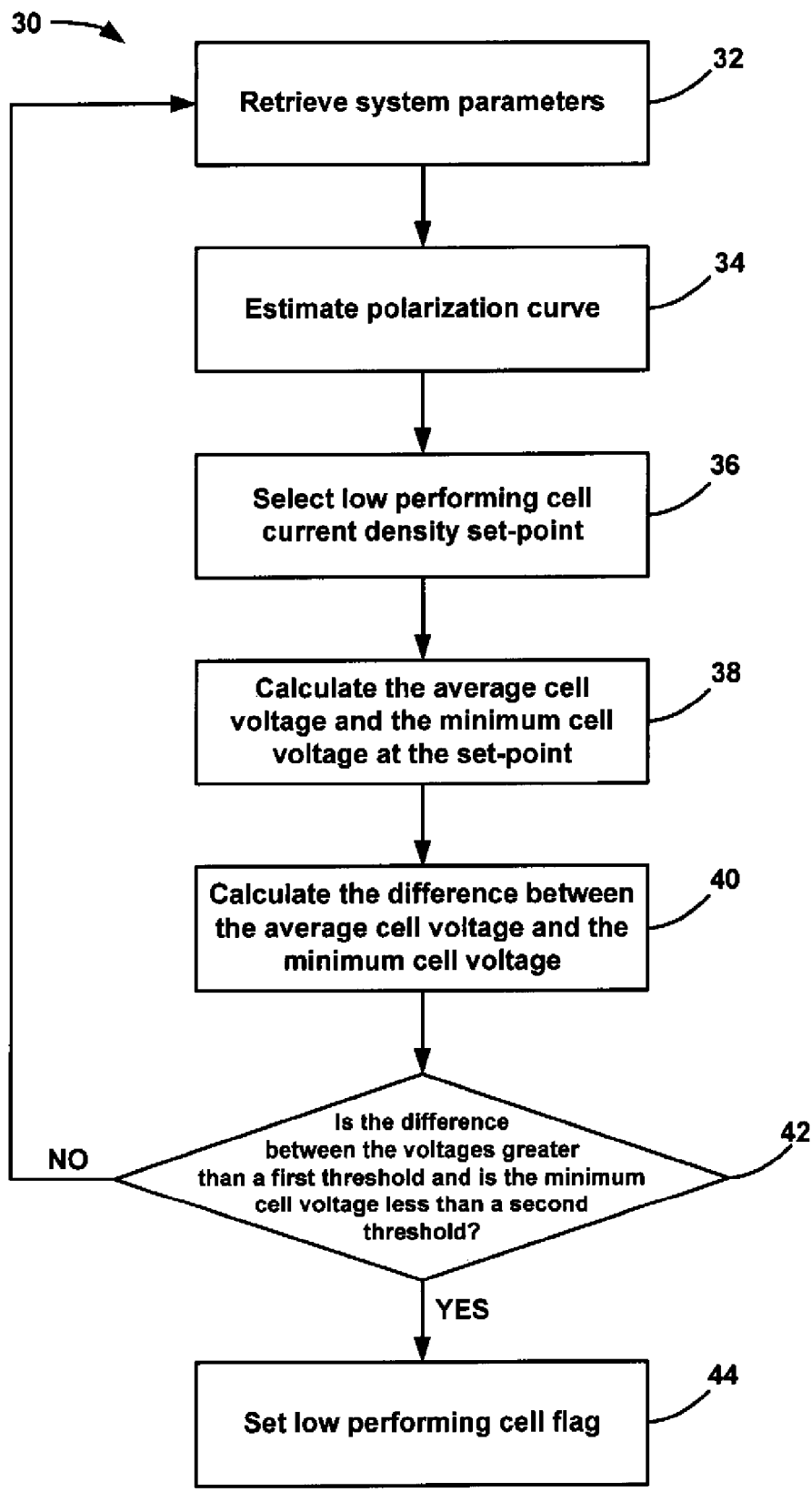
FIG. 3 is a flow chart diagram showing a process for an algorithm that identifies the potential for a low performing cell in the stack, according to an embodiment of the present invention.

FIG. 3 is a flow chart diagram 30 showing a process for an algorithm that identifies a low performing cell, according to an embodiment of the present invention. At box 32, the algorithm retrieves system parameters, typically at fuel cell system shut-down, such as stack current density, average cell voltage and minimum cell voltage, that can be used to estimate the polarization curve of the stack 12 or 14, for example, by the process disclosed in the '898 application. At box 34, the algorithm uses the system parameters to estimate the polarization curve for both the average cell and the minimum cell in the stacks 12 and 14. At box 36, the algorithm defines the current density set-point $j_{sp}^{LPC}$ that will be used to identify whether any of the fuel cells in the stacks 12 or 14 are low performing. In one non-limiting embodiment, the current density set-point $j_{sp}^{LPC}$ is selected to be about 0.9 A/cm², however, any suitable current density in the range 0.6-15 A/cm² could be used. The algorithm calculates the average cell voltage $CV^{Avg}$ and the minimum cell voltage $CV^{Min}$ at the current density set-point $j_{sp}^{LPC}$ at box 38.

The algorithm then determines a delta voltage difference between the average cell voltage $CV^{Avg}$ and the minimum cell voltage $CV^{Min}$ for both of the fuel cell stacks 12 and 14 at box 40. The algorithm then determines whether the delta voltage difference is greater than a predetermined low voltage threshold and the minimum cell voltage is less than a predetermined high voltage threshold at decision diamond 42. In one non-limiting embodiment, the predetermined low voltage threshold is about 150 mV and the high voltage threshold is about 400 mV, however, any suitable voltage in the range of 0-9 mV could be used. If both of these conditions are not met at the decision diamond 42, then the algorithm returns to the box 32 to retrieve system parameters for updating the polarization curves, typically at the next system shut-down. If the delta voltage difference is greater than the predetermined low voltage threshold and the minimum cell voltage is less than the predetermined high voltage threshold at the decision diamond 42, then the algorithm sets a low performing cell flag at box 44 meaning that there is a potential for a low performing cell in which ever of the two stacks 12 or 14 the algorithm is currently analyzing.

After a predetermined number of low performing cell flags have been stored based on a certain analysis scheme, the algorithm can provide an indication that service is necessary so that the low performing cell does not become too low where damage to the fuel cell stack can occur.

The present invention offers a number of advantages for determining low performing cells. For example, only data up to 0.6 A/cm² is required to predict a low performing cell at 0.9 A/cm². Further, easy online differentiation between end of life stack power and low performing stack power can be provided so as to allow a service center to replace cells instead of the entire stack. Further, the process provides a robust method for determining a low performing cell even during a poor polarization curve estimation because it depends on both the average cell voltage and minimum cell voltage estimations. Particularly, if the polarization curve is poor, then both the average cell voltage and the minimum cell voltage estimates would have shifted in the same direction. Also, post processing of data is not necessary to determine that the low performing cell condition exists because post processing is only needed to determine cell location, and it is easy to write simple monitoring algorithms to output the highest occurrence of location on minimum cell. Further, the process avoids run time dynamic monitoring of low performing cells and false low performing cell detection during up-transients due to other control issues, such as lack of air, etc.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for predicting a low performing cell in a fuel cell stack, said method comprising:
   executing, using at least one computing device coupled to a memory, instructions for:
   estimating a polarization curve of the fuel cell stack using system parameters for both an average cell voltage and a minimum cell voltage;
   determining a low performing cell current density set-point;
   calculating an average cell voltage at the current density set-point;
   calculating a minimum cell voltage at the current density set-point;
   determining a difference voltage between the average cell voltage and the minimum cell voltage; and
   determining whether one or both of the difference voltage is greater than a first predetermined voltage threshold and the minimum cell voltage is less than a second predetermined voltage threshold to determine whether the fuel cell stack includes a low performing cell.

2. The method according to claim 1 wherein the low performing cell current density set-point is about 0.9 A/cm².

3. The method according to claim 1 wherein the first predetermined voltage threshold is less than the second predetermined threshold.

4. The method according to claim 3 wherein the first predetermined voltage threshold is about 150 mV and the second predetermined voltage threshold is about 400 mV.

5. The method according to claim 1 wherein the system parameters include stack current density, average cell voltage and minimum cell voltage.

6. The method according to claim 1 further comprising analyzing the determination of a low performing cell over time to determine whether the fuel cell stack should be serviced.

7. The method according to claim 6 wherein analyzing the determination of a low performing cell includes determining whether a low performing cell is getting worse.

8. The method according to claim 1 wherein estimating a polarization curve of a fuel cell stack includes estimating a polarization curve of the fuel cell stack at stack shut-down.

9. The method according to claim 1 where the fuel cell stack is a split stack.

10. A method for predicting a low performing cell in a fuel cell stack, said method comprising:
executing, using at least one computing device coupled to a memory, instructions for:
determining a low performing cell current density set-point;
calculating an average cell voltage at the current density set-point;
calculating a minimum cell voltage at the current density set-point;
determining a difference voltage between the average cell voltage and the minimum cell voltage; and
determining whether the difference voltage is greater than a first predetermined voltage threshold to determine whether the fuel cell stack includes a low performing cell.

11. The method according to claim 10 further comprising determine whether the minimum cell voltage is less than a second predetermined cell voltage threshold to determine whether the fuel cell stack includes a low performing cell, wherein the first predetermined voltage threshold is less than the second predetermined voltage threshold.

12. The method according to claim 11 wherein the first predetermined voltage threshold is about 150 mV and the second predetermined voltage threshold is about 400 mV.

13. The method according to claim 10 wherein the low performing cell current density set-point is about 0.9 A/cm$^2$.

14. The method according to claim 10 further comprising analyzing the determination of a low performing cell over time to determine whether the fuel cell stack should be serviced.

15. A system for predicting a low performing cell in a fuel cell, said system comprising;
means for estimating a polarization curve of the fuel cell stack using system parameters for both an average cell voltage and a minimum cell voltage;
means for determining a low performing cell current density set-point;
means for calculating an average cell voltage at the current density set-point;
means for calculating a minimum cell voltage at the current density set-point;
means for determining a difference voltage between the average cell voltage and the minimum cell voltage; and
means for determining one or both of whether the difference voltage is greater than a first predetermined voltage threshold and the minimum cell voltage is less than a second predetermined voltage threshold to determine whether the fuel cell stack includes a low performing cell.

16. The system according to claim 15 wherein the low performing current density set-point is 0.9 A/cm$^2$.

17. The system according to claim 15 wherein the first predetermined voltage threshold is less than the second predetermined voltage threshold.

18. The system according to claim 17 wherein the first predetermined voltage threshold is about 150 mV and the second predetermined voltage threshold is about 400 mV.

19. The system according to claim 15 further comprising means for analyzing the determination of the low performing cell over time to determine whether the fuel cell stack should be serviced.

20. The system according to claim 15 wherein the fuel cell stack is a split stack.

* * * * *